United States Patent
Patil et al.

(10) Patent No.: US 9,218,294 B1
(45) Date of Patent: Dec. 22, 2015

(54) MULTI-LEVEL LOGICAL BLOCK ADDRESS (LBA) MAPPING TABLE FOR SOLID STATE

(71) Applicant: SK hynix memory solutions inc., San Jose, CA (US)

(72) Inventors: Nishant Patil, Sunnyvale, CA (US); Derrick Preston Chu, Santa Clara, CA (US); Nandan Sridhar, Santa Clara, CA (US); Prasanthi Relangi, San Jose, CA (US)

(73) Assignee: SK Hynix memory solutions inc., San Jose, CA (US)

( * ) Notice: Subject to any disclaimer, the term of this patent is extended or adjusted under 35 U.S.C. 154(b) by 254 days.

(21) Appl. No.: 13/910,908

(22) Filed: Jun. 5, 2013

Related U.S. Application Data (60) Provisional application No. 61/656,164, filed on Jun. 6, 2012.

(51) Int. Cl.
*G06F 12/10* (2006.01)
*G06F 3/06* (2006.01)

(52) U.S. Cl.
CPC ............... *G06F 12/10* (2013.01); *G06F 3/061* (2013.01); *G06F 3/0638* (2013.01)

(58) Field of Classification Search
CPC . G06F 12/0246; G06F 12/0292; G06F 12/10; G06F 12/1009; G06F 3/061; G06F 3/0638
See application file for complete search history.

(56) References Cited

U.S. PATENT DOCUMENTS

| | | | |
|---|---|---|---|
| 5,943,692 A * | 8/1999 | Marberg et al. | 711/203 |
| 8,463,825 B1 * | 6/2013 | Harty et al. | 707/813 |
| 2011/0161562 A1 * | 6/2011 | Chang et al. | 711/103 |
| 2011/0185208 A1 * | 7/2011 | Iwamoto et al. | 713/323 |
| 2014/0019677 A1 * | 1/2014 | Chang et al. | 711/105 |
| 2014/0052899 A1 * | 2/2014 | Nan | 711/103 |
| 2014/0082264 A1 * | 3/2014 | Wan et al. | 711/103 |
| 2014/0095827 A1 * | 4/2014 | Wei et al. | 711/203 |

* cited by examiner

*Primary Examiner* — Hiep Nguyen
(74) *Attorney, Agent, or Firm* — IP & T Group LLP (57) ABSTRACT

An access instruction which includes a logical block address (LBA) is received. A first-level table is accessed to obtain a first-level table entry associated with the LBA. From the first-level table entry, a location associated with a second-level table on solid state storage media is determined. The second-level table is accessed at the determined location to obtain a second-level table entry associated with the LBA. From the second-level table entry, a physical block address corresponding to the logical block address is determined.

18 Claims, 6 Drawing Sheets

MULTI-LEVEL LOGICAL BLOCK ADDRESS (LBA) MAPPING TABLE FOR SOLID STATE

CROSS REFERENCE TO OTHER APPLICATIONS

This application claims priority to U.S. Provisional Patent Application No. 61/656,164 entitled MULTI-LEVEL LOGICAL BLOCK ADDRESS (LBA) MAPPING TABLE FOR SOLID STATE DRIVES filed Jun. 6, 2012 which is incorporated herein by reference for all purposes.

BACKGROUND OF THE INVENTION

Systems which include solid state storage (e.g., NAND Flash storage) typically convert logical block addresses to physical blocks addresses and vice versa. New techniques for converting a logical block address to a physical block address which are faster, smaller, and/or less expensive than current systems would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
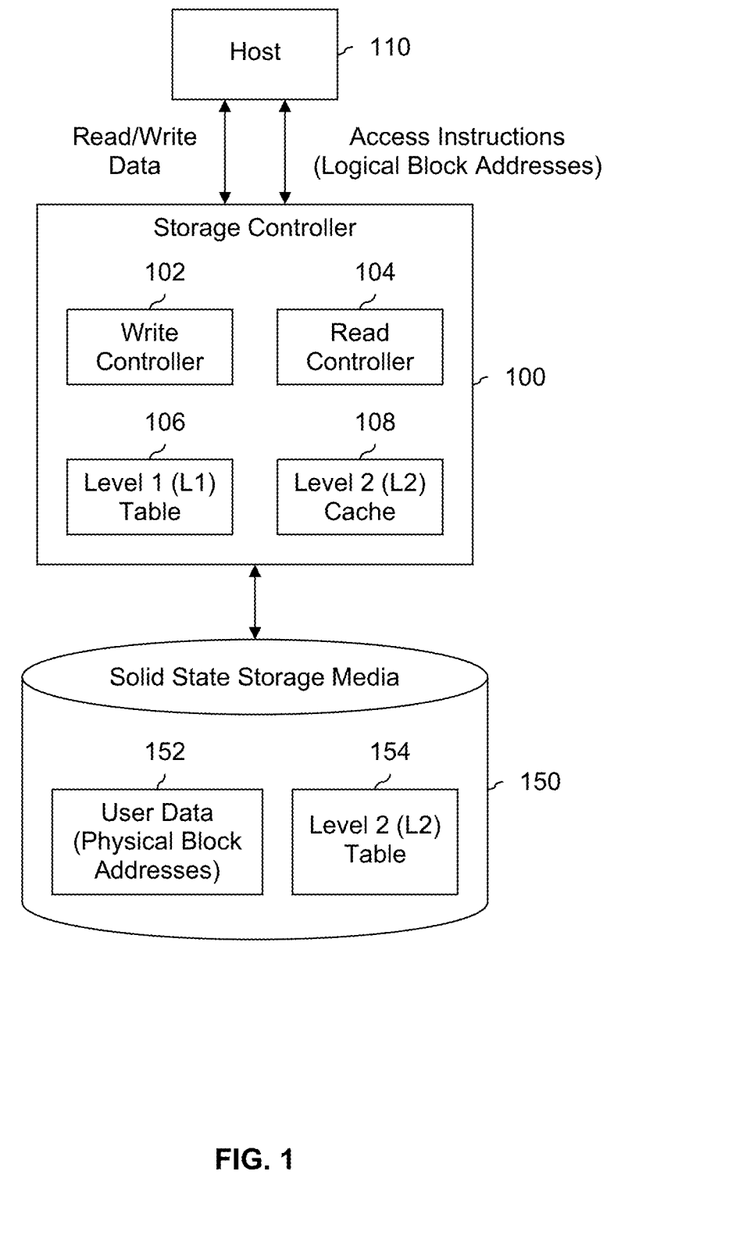
FIG. 1 is a diagram showing an embodiment of an embedded Multi-Media Controller (eMMC) system which uses two-level address mapping.

FIG. 1 is a diagram showing an embodiment of an embedded Multi-Media Controller (eMMC) system which uses two-level address mapping. In various embodiments, an eMMC system has a storage controller (e.g., storage controller 100) and solid state storage (e.g., solid state storage media 150) on the same semiconductor die, or alternatively they are on different die but in the same package. Example systems which incorporate eMMC systems include tablets, smartphones, GPS systems, eReaders, and other mobile computing devices. Oftentimes, eMMC systems are price and/or size sensitive. In some embodiments, storage controller 100 is a semiconductor device, such as an application-specific integrated circuit (ASIC) or a field-programmable gate array (FPGA). In some embodiments, solid state storage media 150 includes NAND Flash.

Host 110 sends access instructions (e.g., read instructions or write instructions) to storage controller 100. These access instructions from host 110 use logical block addresses and so a mapping from logical block address to physical block address is performed so that write controller 102 and read controller 104 can properly execute write instructions and read instructions, respectively, from host 110. In this example, a two level system is used to map logical block addresses to physical block addresses.

Level 1 (L1) table 106 is used to perform the first level of mapping and as such L1 table 106 is may be referred to herein as a first-level table. Using a logical block address specified in an access instruction received from host 110, a table entry in L1 table 106 which corresponds to the specified logical address is obtained. For example, L1 table 106 may be arranged so that entries are arranged according to logical block address in ascending (descending) order. In some embodiments, L1 table 106 may arranged as a tree. The obtained first-level table entry from L1 table 106 indicates where to go to for the second level of mapping.

In this eMMC example, L2 cache 108 on storage controller 100 and L2 table 154 on solid state storage media 154 are used to perform the second level of mapping. L2 table 154 may, as such, be referred to as a second-level cache and a second-level table, respectively. L2 cache 108 contains the most recently used second-level table entries from L2 table 154 and in some cases there will be a cache hit when a desired second-level table entry has been recently used (e.g., because it was desired or near a desired second-level table entry) and, as such, a table entry associated with that logical block address is stored in L2 cache 108. When a cache hit occurs, instead of accessing L2 table 154 on solid state storage media 150, L2 cache 108 on storage controller 100 is accessed. This may be desirable because it is faster, it keeps the I/O bus between storage controller 100 and solid state storage media 150 free, and/or it does not contribute to wear of solid state storage media 150.

Naturally, an appropriate first-level table entry in L1 table 106 is updated when a given second-level table entry enters L2 cache 108 so that it is known to go to L2 cache 108 for that second-level table entry and not L2 table 154. Similarly, should a particular second-level table entry be evicted from L2 cache 108, L1 table 106 is updated so that that second-level table entry is obtained from L2 table 154 and not L2 cache 108.

Regardless of whether L2 cache 108 or L2 table 154 is accessed at the second level of mapping, the physical block address corresponding to the logical block address is obtained from the appropriate table entry (i.e., from L2 cache 108 or L2 table 154). That physical block address is a location in user data 152 (which like L2 table 154 is on solid state storage media 150) and is the physical block address which corresponds to the specified logical block address.

In some embodiments, the I/O bus between solid state storage media 150 and storage controller 100 can only transfer relatively large amounts of data, such as 2 kB or 4 kB. In such configurations, when a second-level table entry from L2 table 154 is obtained (i.e., when there is no cache hit), multiple second-level table entries (including some that are not associated with the logical block address specified by host 110) are returned to storage controller 100. In some such embodiments, all of the entries returned from L2 table 154 (e.g., including ones not associated with a specified logical block address) are stored in L2 cache 108.

In some embodiments, L2 cache 108 is full and some data needs to be evicted in order to make room for a new cache entry. In one example, a least recently used (LRU) eviction technique is used where the second-level table entry (or, alternatively, group of second-level table entries) which has been unused for the longest time is evicted.

In various embodiments, various types of writes may be received. In one example, a write instruction from host 110 includes a new logical block address which has not been observed before. In some such embodiments, a new second-level table entry is created in L2 cache 108 and at some appropriate time later on, that second-level table entry is written to L2 table 154. L1 table 106 is updated as needed so that it points to the appropriate second-level table entry (e.g., L2 cache 108 versus L2 table 154 and where specifically within the specified one of those two).

In some cases, a write instruction from host 110 includes a logical block address which has been observed before where the data is written to a new physical block address (i.e., an in-place write is not performed). In some such embodiments, a second-level table entry with the new physical block address is stored in L2 cache 108. At some appropriate time later on, the second-level table entry with the new physical block address is written to L2 table 154. Naturally, L1 table 106 is kept up to date to always point to the proper second level table entry.

The system shown in FIG. 1 was compared against other systems in the same test infrastructure and performed significantly better. All of the tested systems were prohibited from having a dynamic random-access memory (DRAM) on which to store mapping information. Beyond that, specific design details of the other systems are not known because those other systems are designed by competitors. However, in spite of this lack of design insight, it is believed that the system shown here is different from those competing designs because of the noticeable difference in performance.

Figure 2:
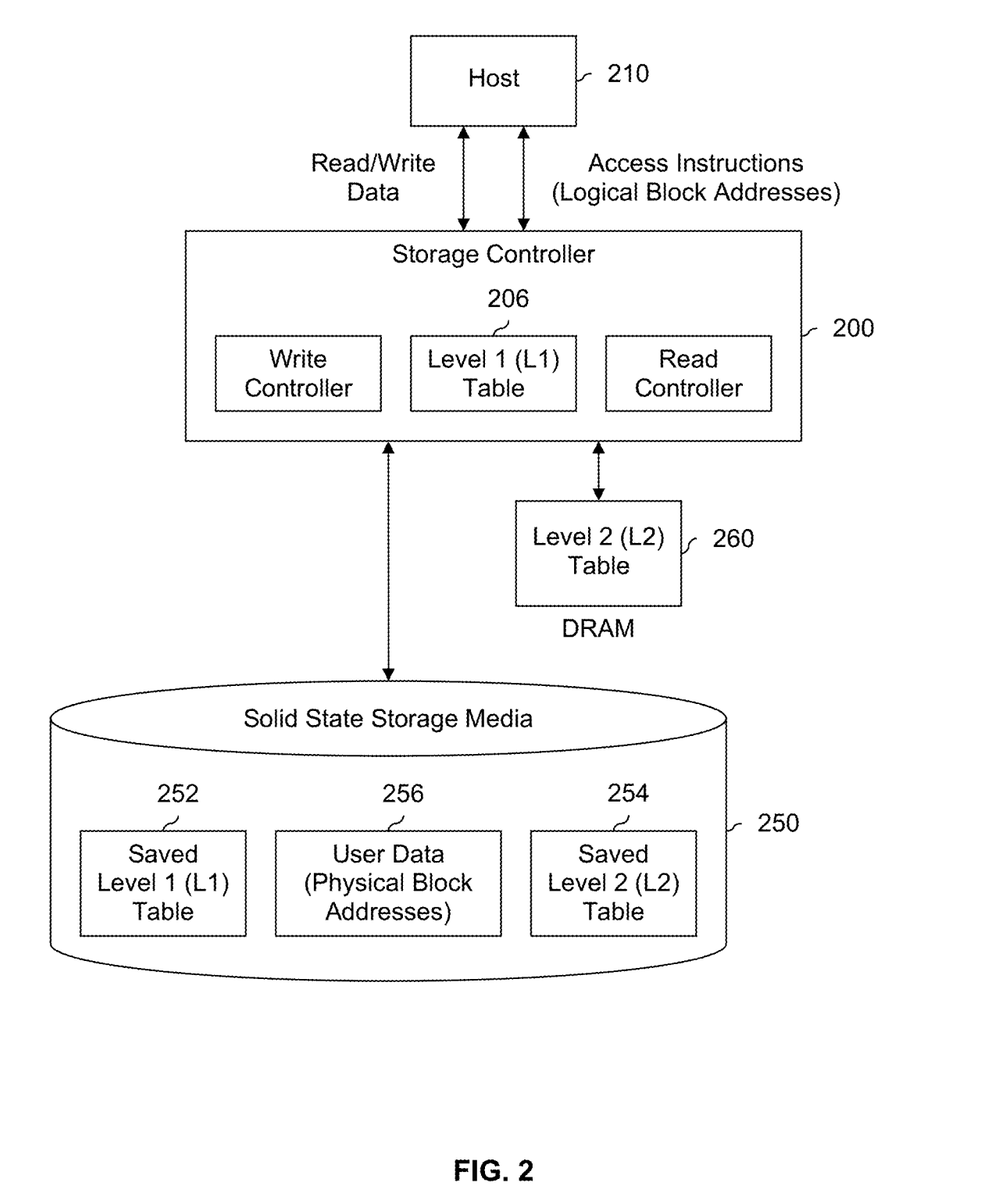
FIG. 2 is a diagram showing an embodiment of a solid state drive (SSD) system which uses two-level address mapping.

FIG. 2 is a diagram showing an embodiment of a solid state drive (SSD) system which uses two-level address mapping. Compared to eMMC systems (one example of which is shown in FIG. 1), SSD systems tend to be less cost sensitive and less size sensitive. As such, the added cost and size of a DRAM (which is used to store mapping information) is acceptable.

The system shown in FIG. 2 has some similarities to the system shown in FIG. 1. For example, both have two levels of mapping where the first level of mapping is obtained from L1 table 206. However, the second level of mapping is implemented slightly differently than in the previous example. During normal operation, L1 table 206 performs the first level of mapping and L2 table 260 on DRAM performs the second level of mapping. In the event a power down instruction is received (or some other instruction for some other lower power state such as sleep, hibernate, etc.), L1 table 206 is saved on solid state storage media 250 as saved L1 table 252. In this example, the storage in storage controller 200 on which L1 table 206 is stored is volatile, meaning that the information is not guaranteed after a loss of power. In contrast, solid state storage media 250 is non-volatile and information stored on solid state storage media 250 is safely preserved in the absence of power. The DRAM on which L2 table 260 is stored is also volatile, so L2 table 260 is saved on solid state storage media 250 as saved L2 table 254. In the event of an unexpected or unsolicited power loss, the L1 table is rebuilt from scratch by scanning a saved L2 table.

Although not shown in FIG. 1, the power down and power up techniques described with respect to the SSD system shown in FIG. 2 are also applicable to an eMMC system. For example, in the event a power down instruction is received, L1 table 106 in FIG. 1 may be stored in solid state storage media 150. It may be acceptable to lose L2 cache 108 during a solicited power down (i.e., so in some embodiments L2 cache 108 is not saved to solid state storage media 150) and L2 table 154 is already on solid state storage media 150, so it is not necessary to save or back up L2 table 154.

In some other embodiments, an L1 table is stored on DRAM as opposed to a storage controller. For example, at some point, an L1 table may grow too big to be stored on a storage controller and it is moved to a DRAM (e.g., the same one on which an L2 table is stored).

An advantage to storing L1 table 206 and L2 table 260 in solid state storage media 250 is that access instructions from host 210 may be serviced after a solicited power down. If mapping information was lost as a result of not being saved in the event of a solicited power down, it would not be possible to access data stored in user data 256.

Once power is restored, saved L1 table 252 is transferred back to storage controller 200 and is used to restore L2 table 206 (which was wiped out by the power down). Typically, an L1 table is relatively small and so the amount of time to transfer saved L1 table 252 from solid state storage media 250 to storage controller 200 is relatively short. Once L1 table 206 has been restored on storage controller 200, it is used to perform the first level of mapping.

Since L2 tables tend to be relatively larger than L1 tables (and transfer times are correspondingly larger), saved L2 table 254 on solid state storage media 250 is used (at least temporarily) as the active L2 table. For example, right after L1 table 206 is restored but before any of saved L2 table 254 has been used to restore L2 table 260 on DRAM, all of the second level mapping is performed using saved L2 table 254. As time goes on, L2 table 260 is read into DRAM from saved L2 table 254. For example, as second-level table entries in saved L2 table 254 are copied to L2 table 260, the appropriate first-level table entry in L2 table 206 is updated to point to L2 table 260 instead of saved L2 table 254. Note that at any given time, L1 table 206 points to the appropriate second-level table entry (e.g., either in saved L2 table 254 or L2 table 260).

In some applications, the restoration process described above is attractive because it enables access instructions from host 210 to be serviced relatively quickly after power is restored. For example, a system manufacturer may require components to be operational within a relatively short amount of time (e.g., 30 mS) after a power up (e.g., Intel requires this for DEVSLEEP mode). Since the technique described above does not require transfer of all of saved L2 table 254 to the DRAM before access instructions can be serviced, access instructions may be serviced relatively quickly after power is restored. Note that in some embodiments, L2 chunks are read out of order. For example, if one L2 table entry associated with an earlier received access instruction is on the solids state storage media but another L2 table entry associated with a later received access instruction is has been moved to the DRAM, the second L2 table entry may be obtained first (e.g., because of differences in access times and/or different assigned prioritizations) even though the associated access instruction was received later. This may be attractive because the overall response times are better since faster accesses are not held up by slower accesses.

In some embodiments, to further reduce a power up time after power is restored, entries in saved L1 table 252 are modified (e.g., prior to storage) to point to saved L2 table 254 (e.g., as opposed to pointing to L2 table 260 like L1 table 206 does). Then, when power is restored, saved L1 table 252 only needs to be copied from solid state storage media 250 to storage controller 200 (e.g., because any modification to make restored L1 table 206 to point to saved L2 table 254 has already been performed). After power is restored, L2 table 260 on the DRAM is invalid and so the restored L1 table 206 should not point there, at least at first.

In some cases, it is desirable for a power down to be completed in a relatively short amount of time. For example, this may be a requirement by system manufacturers for components used in their systems (e.g., Intel and their DEVSLEEP mode). The power down time may be too short for all of L1 table 206 and L2 table 260 to be transferred to solid state storage media 250, so in some embodiments where a relatively short power down is desired, at least some of L1 table 206 and/or L2 table 260 is copied to solid state storage media 250 even before a power down instruction is received. Thus, at any given time, only a relatively small amount of information need to be transferred to solid state storage media 250 so that if a power down is instruction is received, the power down time is relatively short. In some embodiments, ensuring that at most a certain amount of changes is outstanding may be tracked and/or managed using dirty bits and/or some threshold. This is described in further detail below.

Note that although FIGS. 1 and 2 show different applications, the two systems show some common features. For example, both used a first-level table on the storage controller and use a second-level table on solid state storage media (at least some of the time, for example immediately after power is restored on the case of the SSD example). Also, in both examples, the first-level of mapping points to an appropriate table entry or location in second-level mapping. That location or table entry in second-level mapping contains a physical block address corresponding to a desired logical block address which in turn is used to access user data on solid state storage media.

Figure 3:
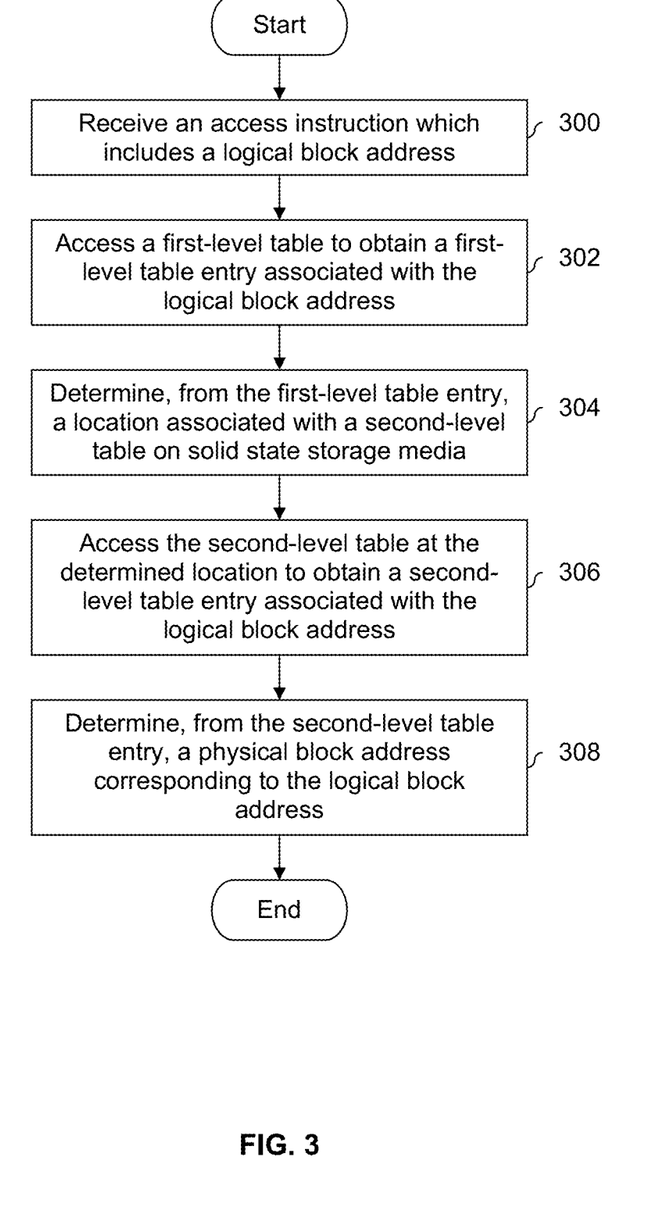
FIG. 3 is flowchart illustrating an embodiment of a multi-level address mapping process.

FIG. 3 is flowchart illustrating an embodiment of a multi-level address mapping process. In some embodiments, the process is performed by storage controller 100 in FIG. 1 when there is no cache hit. In some embodiments, the process is performed by storage controller 200 in FIG. 2 after power is restored for those second-level entries which have yet to be restored to L2 table 260 from saved L2 table 254.

At 300, an access instruction which includes a logical block address is received. In various embodiments, the access instruction is a read instruction or a write instruction. In the example of FIG. 1, an access instruction may be received from host 110. In the example of FIG. 2, an access instruction may be received from host 210.

At 302, a first-level table is accessed to obtain a first-level table entry associated with the logical block address. L1 table 106 in FIG. 1 and L1 table 206 in FIG. 1 are examples of a first-level table accessed at step 302. In some embodiments, each table entry in an L1 table includes the corresponding logical block address, so a single table entry may be uniquely identified using a logical block address received at 300.

From the first-level table entry, a location associated with a second-level table on solid state storage media is determined at 304. For example, the location may be stored in certain bits in the first-level table entry. An example structure of a first-level table entry is described in further detail below.

At 306, the second-level table is accessed at the determined location to obtain a second-level table entry associated with the logical block address. In some embodiments, accessing a second-level table at 306 includes obtaining extra or additional entries from the second-level table which are not associated with the specified logical block address. For example, in FIGS. 1 and 2, suppose the I/O bus between storage controller 100/200 and solid state storage media 150/250 returns 2,048 bits at a time. If a single table entry in L2 table 154/254 is only 32 bits, then each read returns 64 entries, 63 of which are not associated with the specified logical block address. In some embodiments, all of the returned entries are cached in L2 cache 108 in FIG. 1, or all of the entries are copied to L2 table 260 in FIG. 2 which is in the process of being rebuilt after power is restored.

At 308, from the second-level table entry, a physical block address corresponding to the logical block address is determined. For example, certain bits in the second-level table entry may be used to store a page number and/or a block number in solid state storage media corresponding to the specified logical block address. An example format of a second-level table entry is described in further detail below.

After the physical block address is obtained, the received access instruction may be performed. For example, if the access instruction is a read instruction, the read data may be obtained from solid state storage media at the obtained physical block address and returned to the host.

Figure 4:
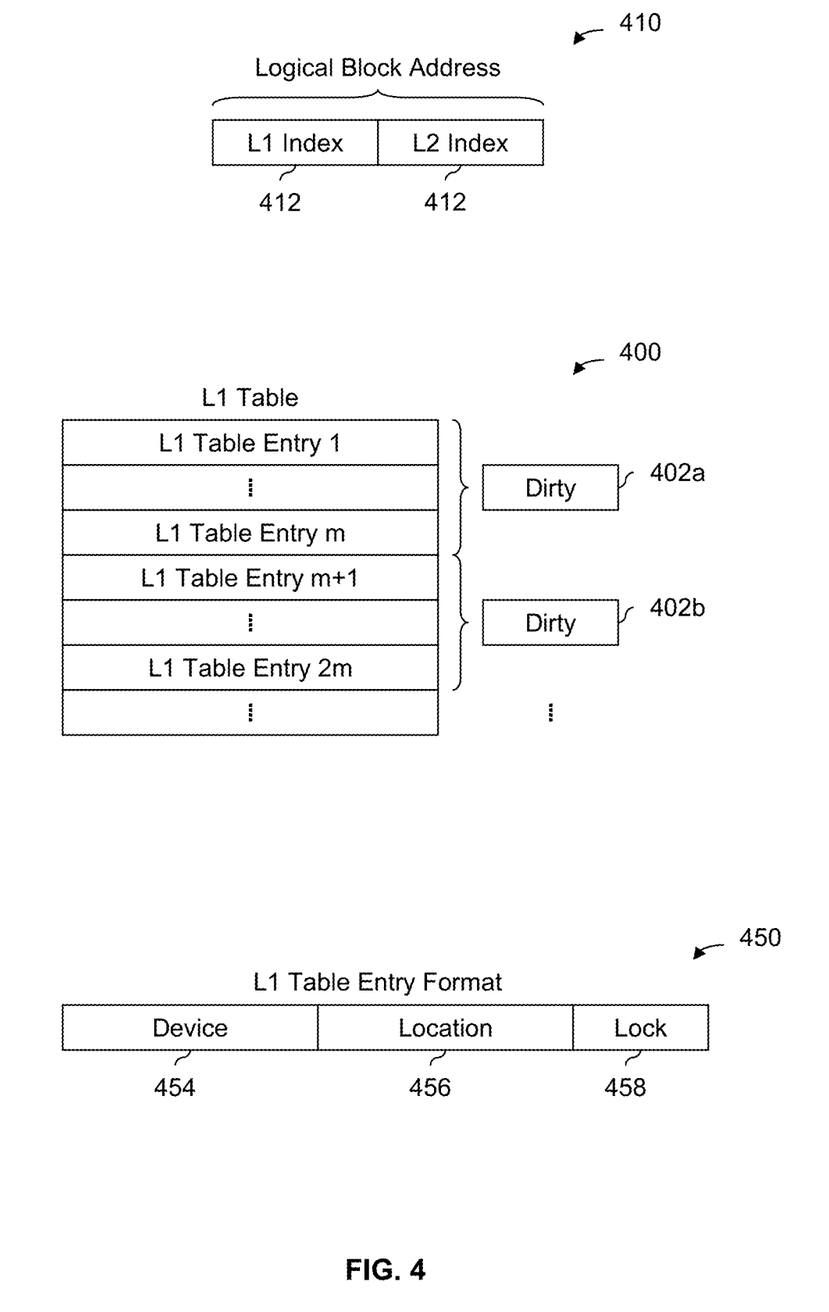
FIG. 4 is a diagram showing an embodiment of a first-level table.

FIG. 4 is a diagram showing an embodiment of a first-level table. In some embodiments, L1 table 106 in FIG. 1, L1 table 206 in FIG. 2, and/or saved L1 table 252 in FIG. 2 are implemented as shown. L1 table 400 includes any number of table entries, any number of which may be used at any given time. For example, when a system is brand new and no user data has been stored in solid state storage, L1 table 400 is unused because no logical block addresses (e.g., included in access instructions) have been received and there is no address mapping which needs to be tracked.

In some embodiments, a dirty bit is associated with a group of m first-level table entries. For example, in FIG. 2, dirty bits 402a-402b may be used to track which groups of table entries in L2 table 206 have not yet been saved in saved L1 table 252. Dirty bits 402a-402b may be used to ensure that only a relatively small amount of changes are outstanding at any time to ensure that a power down (if requested or indicated) is relatively short. The size of m may correspond to or depend on how many second-level table entries can be written in a single write operation.

Alternatively, in some embodiments, the size of an L1 table is so small that it is not necessary to store (at least partially) an L1 table before a power down instruction is received. Put another way, in some embodiments, an entire L1 table is saved to solid state storage media only when a power down instruction is received.

L1 table entry format 450 shows one example format of an L1 table entry. Naturally, in some other embodiments, first-level table entries have some other formatting. In this example, there are 3 fields: device 454, offset 456, and lock bit 458.

To know which table entry in L1 table 400 is the appropriate one, within logical block address 410, certain bits (called an L1 index (412)) are used to determine the location of the desired L1 table entry in L1 table 400. For example, the L1 index may be an offset from the top of L1 table 400 to the appropriate L1 table entry.

Device 454 identifies the device on which the appropriate L2 table is located. For example, suppose device 454 has 2 bits. If the value of the field is 00, then that corresponds to a second-level table or cache on a storage controller (e.g., L2 cache 108 in FIG. 1). If the value of the field is 01, then that corresponds to a second-level table on solid state storage media (e.g., L2 table 154 in FIG. 1 or saved L2 table 254 in FIG. 2). If the field is 10, then that corresponds to a second-level table on some other device (e.g., L2 table 260 on DRAM in FIG. 2). A value of 11 (in this example at least) is reserved for future use (e.g., for some other second-level table on some other device).

Location 456 gives the location within the specified L2 table (e.g., on the device specified by field 454). In some embodiments, depending upon the value of device field 454, location 456 may be interpreted in a variety of ways. To continue the example from above, if device 454 is 00 (i.e., indicating a second-level table on a cache) and a second-level cache only has 16 entries, then a value in the range of [0,15] may be used. Or, if device 454 is 01 (i.e., second-level table on solid state storage media), then field 456 indicates a location on solid state storage media for which multiple L2 table entries are returned (e.g., an I/O bus between solid state storage media and a storage controller has a width of 2,048 bits and returns multiple table entries). To know which is the desired L2 table entry within the group of L2 table entries returned from solid state storage media, L2 index 414 is used. For example, L2 index 414 may be an offset from the top of the group of returned L2 table entries. Together, device 454 and location 456 (and, if needed, L2 index 414) enable the proper second-level table entry to be obtained.

Lock bit 458 is used to indicate that an update is being made to a first-level table entry. For example, if the value of field 458 is 1, then a read of that first-level table entry is not permitted until that field returns to 0. In one example, after power is restored in FIG. 2, second-level table entries are copied from saved L2 table 254 to L2 table 260 as part of the restoration process. After copying a given second-level table entry over to the DRAM, the lock bit for the corresponding first-level table entry is set to 1 while L2 table location 454 and/or location within L2 table 456 are updated to point from a second-level table entry in saved L2 table 254 to a second-level table entry in L2 table 260. In some embodiments, an L1 table tracks two or more locations for a given second-level table entry while also tracking which should be accessed for a corresponding access instruction. For example, in order to preserve the old L2 table entry (e.g., on solid state storage media) after a solicited power down/power up, the corresponding L1 table entry will always keep track of the most up-to-date saved L2 location in the solid state storage media (e.g., in addition to any L2 location on a restored L2 table in DRAM). Put another way, in some embodiments, a L1 table entry points to both a location in a save L2 table (on solid state storage media) and a location on a restored L2 table (e.g., on DRAM).

Figure 5:
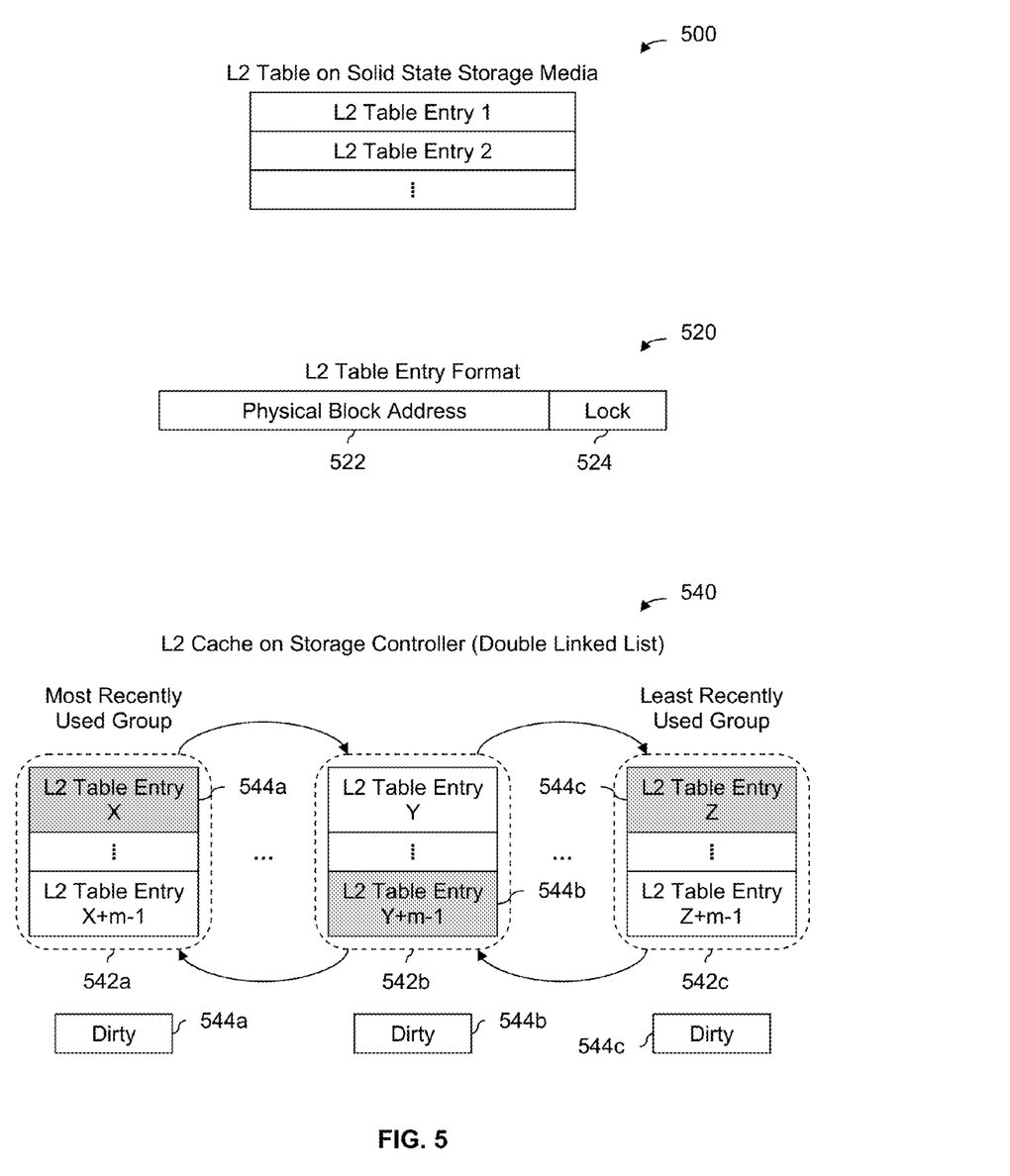
FIG. 5 is a diagram showing embodiments of a second-level table and a cache.

FIG. 5 is a diagram showing embodiments of a second-level table and a cache. In the example shown, L2 table 500 is on solid state storage media and entries in L2 table 500 have a format shown by L2 table entry format 520. In this example, L2 table entries have two fields: physical block address 522 and lock bit 524. Field 522 contains the physical block address which corresponds to a specified or received logical block address and is a location or address in solid state storage (e.g., in user data 152 in FIG. 1 or user data 256 in FIG. 2). As before, lock bit 524 is used to indicate if any update is being performed. If the value of the field is a 1, then a read of that second-level table entry is not permitted. For example, if a write instruction is received from a host and the specified logical block address has not been observed before, a new second-level table entry is created and the mapping is saved. While this new second-level table entry is being created, the lock bit for that second-level table entry may be set to 1. When the new second-level table entry is ready to be read, the field is returned to 0. This is one example of how a lock bit may be used. In some embodiments, L2 table 154 in FIG. 1 and/or saved L2 table 254 in FIG. 2 are implemented as shown in diagrams 500 and 520.

Diagram 540 shows an example of an L2 cache on a storage controller. In some embodiments, L2 cache 108 in FIG. 1 is implemented as shown. In diagram 540, group 542a is the most recently used group and group 542c is the least recently used group; each of groups 542a-542c includes m second-level table entries. The format of second-level table entries in groups 542a-542c follows that shown in diagram 520.

As is shown in this example, in some embodiments, an entire group of returned second-level tables, and not just a desired second-level table entry, is cached. To use FIG. 1 as an example, the I/O bus between storage controller 100 and solid state storage media 150 returns m second-level table entries to storage controller 100, even if only one second-level table entry from that group was desired or associated with a specified logical block address. Returning to FIG. 5, in group 542a, second-level table entry 544a in that group is the desired one (e.g., because it is associated with a specified logical block address). The other second-level table entries in group 542a were not necessarily desired but were returned because they were next to desired second-level table entry 544a. Similarly, in group 542b, second-level table entry 544b is/was associated with a specified logical block address and in group 542c, second-level table entry 544c is/was associated with a specified logical block address.

In this example, L2 cache 540 is implemented as a double linked list, where each group is linked to the group before it and the group after it (naturally, except for those groups at the ends). Within the double linked list, groups are arranged based on how recently a group was used. In this example, the leftmost group (i.e., group 542a) is the most recently used group and the rightmost group (i.e., group 542c) is the least recently used group, with the groups in between arranged in descending order. Using a double linked list may be attractive because it is relatively easy to discard least recently used group 542c when one of the groups needs to be evicted and/or it is relatively easy to make a group (currently in the cache) to the most recently used group when there is cache hit (e.g., because only the links needs to be updated). For example, if there is a cache hit for group 542b, the links to its neighbors are reconnected so that the two neighbors now point to each other, and group 542b is linked to the left of group 542a so that group 542b becomes the new most recently used group.

Dirty bits 544a-544c are used to record which groups have information (i.e., at least one second-level table entry) which is newer than what is stored in solid state storage media. For example, suppose most recently used group 542*a* was elevated to that position because a write instruction was received from a host and table entry 544*a* needs to be updated because there is a new physical block address, or because this is the first time the logical block address was observed. An appropriate second-level table entry is saved in entry 544*a* and dirty bit 544*a* is set to 1. At an appropriate time (e.g., when an I/O bus is free, when a certain number of dirty bits have accumulated, etc.), group 542*a* is written to the proper location in solid state storage media and dirty bit 544*a* is returned to 0. Note that the example shown herein assumes that the amount of information returned from solid state storage media during a read and sent to solid state storage media during a write are the same. Dirty bits are used to track a group of data to be written and the size of that group (m, in this example) corresponds to however many second-level table entries are written to solid state storage media in a single write.

In some applications, because of a required or desired tolerance associated with dirty second level mapping, there is too much overhead to maintain a double linked list. As such, in some embodiments, a least recently used scheme is not used for cache eviction and/or a cache is not implemented as a double linked list.

Figure 6:
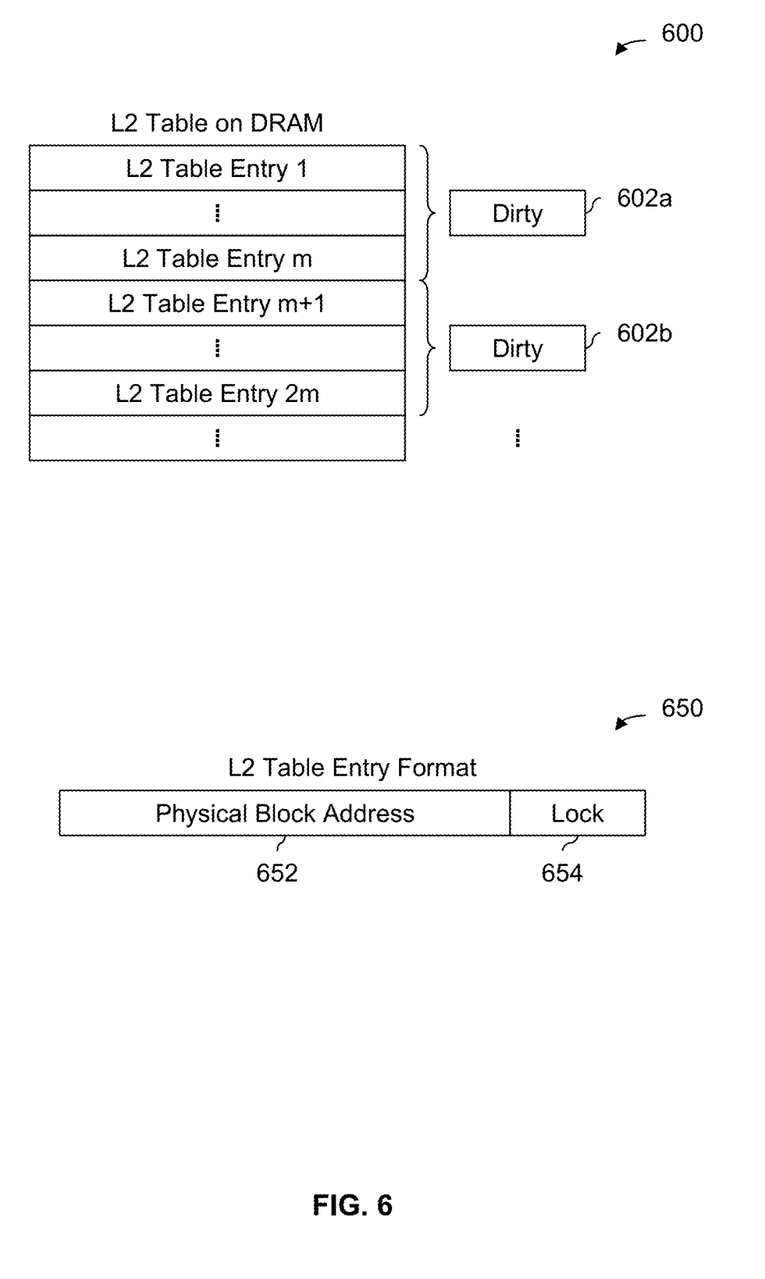
FIG. 6 is a diagram showing embodiments of a second-level table on DRAM.

FIG. 6 is a diagram showing embodiments of a second-level table on DRAM. In some embodiments, L2 table 260 on DRAM in FIG. 2 may be implemented as L2 table 600. L2 table 600 includes multiple table entries, any number of which may be used.

Dirty bits 602*a* and 602*b* are similar to the dirty bits described in FIG. 5. Dirty bits 602*a*-602*b* may be used to ensure that if a power down indication is received, the power down time is relatively short since only a relatively small amount of data needs to be saved to solid state storage media before the system is powered down. For example, in the background, if more than a threshold number of dirty bits are set, the corresponding groups of second-level table entries are written to solid state storage media and then the corresponding dirty bit is returned to 0. In some embodiments once a threshold is exceeded, all changed groups are saved to solid state storage media until there are no groups with dirty bits set to 1. As before, the value of m depends on how many second-level table entries are written to solid state storage in a single write operation.

Diagram 650 shows an example of the formatting of the second-level table entries in L2 table 600. Similar to FIG. 5, each table entry includes 2 fields: physical block address 652 and lock bit 654.

Note that although the examples described herein discuss two-level mapping examples, any number of levels may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an access instruction which includes a logical block address;
   accessing a first-level table to obtain a first-level table entry associated with the logical block address, wherein the first-level table is stored on a storage controller;
   using a processor to determine, from the first-level table entry, a location associated with a second-level table entry;
   in the event the determined location is on solid state storage media, accessing the determined location on the solid state storage media in order to obtain the second-level table entry;
   in the event the determined location is on the storage controller, accessing the determined location on the storage controller in order to obtain the second-level table entry; and
   using the processor to determine, from the second-level table entry, a physical block address on the solid state storage media corresponding to the logical block address.

2. The method of claim 1, wherein the method is performed by a semiconductor device, including one or more of the following: an application-specific integrated circuit (ASIC) or a field-programmable gate array (FPGA).

3. The method of claim 1, wherein the solid state storage media includes NAND Flash.

4. The method of claim 1, wherein the access instruction includes one or more of the following: a read instruction or a write instruction.

5. The method of claim 1, wherein:
   an amount of data transferred from the solid state storage media to the storage controller in a single read instruction is greater than the size of a single second-level table entry;
   accessing the determined location on the solid state storage media includes obtaining a plurality of second-level table entries from the solid state storage media; and
   at least one of the plurality of second-level table entries is associated with the logical block address and least one of the plurality of second-level table entries is associated with another logical block address.

6. The method of claim 5, further including saving the plurality of second-level table entries to a second-level cache on the storage controller.

7. The method of claim 1, saving at least the second-level table entry to a second-level cache on the storage controller.

8. The method of claim 1 further including saving the first-level table to the solid state storage media in the event a power down instruction is received.

9. The method of claim 1, wherein:
   a second-level table is located on dynamic random-access memory (DRAM); and
   the method further includes prior to receiving a power down instruction, saving at least some portion of the second-level table on the DRAM to the solid state storage media.

10. The method of claim 9, wherein:
    one or more dirty bits are used to track changed groups of second-level table entries in the second-level table on the DRAM; and
    in the event the number of dirty bits exceeds a threshold, saving at least one of the changed groups of second-level table entries to the solid state storage media.

11. The method of claim 10 further comprising, in response to receiving the power down instruction:
    saving, to the solid state storage media, any remaining changed groups of second-level table entries based at least in part on the dirty bits; and
    after saving any remaining changed groups of second-level table entries, powering down.

12. The method of claim 1, wherein:
    a second-level table is located on dynamic random-access memory (DRAM); and
    the method further includes in response to receiving a power up instruction:

restoring the first-level table on the storage controller using a saved first-level table on the solid state storage media; and restoring the second-level table on the DRAM using a saved second-level table on the solid state storage media.

13. The method of claim 12 further comprising:

after receiving the power up instruction, receiving a second access instruction which includes a second logical block address;

accessing the restored first-level table to obtain a second first-level table entry associated with the second logical block address; and using the processor to determine, from the second first-level table entry, if a second second-level table entry associated with the second logical block address is on the restored second-level table on the DRAM or on the saved second-level table on the solid state storage media.

14. A system, comprising:

a host interface configured to receive an access instruction which includes a logical block address; and a processor configured to:
   access a first-level table to obtain a first-level table entry associated with the logical block address, wherein the first-level table is stored on a storage controller;
   determine, from the first-level table entry, a location associated with a second-level table entry;
   in the event the determined location is on solid state storage media, access the determined location on the solid state storage media in order to obtain the second-level table entry;
   in the event the determined location is on the storage controller, access the determined location on the storage controller in order to obtain the second-level table entry; and
   determine, from the second-level table entry, a physical block address on the solid state storage media corresponding to the logical block address.

15. The system of claim 14, wherein:

an amount of data transferred from the solid state storage media to the storage controller in a single read instruction is greater than the size of a single second-level table entry;

the processor is configured to access the determined location on the solid state storage media, including by: obtaining a plurality of second-level table entries from the solid state storage media; and at least one of the plurality of second-level table entries is associated with the logical block address and least one of the plurality of second-level table entries is associated with another logical block address.

16. The system of claim 14, wherein the processor is further configured to: save at least the second-level table entry to a second-level cache on a storage controller.

17. The system of claim 14, wherein:

a second-level table is located on dynamic random-access memory (DRAM); and the processor is further configured to prior to receiving a power down instruction, save at least some portion of the second-level table on the DRAM to the solid state storage media.

18. The system of claim 14, wherein:

a second-level table is located on dynamic random-access memory (DRAM); and the processor is further configured to in response to receiving a power up instruction:
   restore the first-level table on the storage controller using a saved first-level table on the solid state storage media; and
   restore the second-level table on the DRAM using a saved second-level table on the solid state storage media.

* * * * *